(12) United States Patent
Schmidt et al.

(10) Patent No.: US 6,634,085 B1
(45) Date of Patent: Oct. 21, 2003

(54) METHOD OF ATTACHING A MAGNETIC RECORDING HEAD SUSPENSION ASSEMBLY TO A THERMOPLASTIC ACTUATOR ARM

(75) Inventors: Ryan Schmidt, Santa Barbara, CA (US); Kevin Hanrahan, Santa Barbara, CA (US)

(73) Assignee: Intriplex Technologies, Inc., Santa Barbara, CA (US)

( * ) Notice: Subject to any disclaimer, the term of this patent is extended or adjusted under 35 U.S.C. 154(b) by 229 days.

(21) Appl. No.: 09/641,805

(22) Filed: Aug. 17, 2000

Related U.S. Application Data

(62) Division of application No. 09/030,597, filed on Feb. 25, 1998, now abandoned.

(51) Int. Cl.[7] .................................................. G11B 5/48
(52) U.S. Cl. ................................ 29/603.03; 29/603.04; 29/603.06; 29/525.07; 29/521; 156/73.1; 156/309.6; 360/244.5; 360/244.7
(58) Field of Search ......................... 29/603.03, 603.04, 29/603.06, 525.06, 525.07, 521; 156/73.1, 73.5, 309.6; 360/244.5, 244.7

(56) References Cited

U.S. PATENT DOCUMENTS

| | | | | |
|---|---|---|---|---|
| 4,925,507 A | * | 5/1990 | Yamaguchi | 156/73.1 |
| 4,991,045 A | * | 2/1991 | Oberg | 360/244.5 |
| 5,715,117 A | * | 2/1998 | Brooks | 360/244.5 |

OTHER PUBLICATIONS

Tsujino, J., Recent Developments of Ultrasonic Welding, Ultrasonics Symposium, 1995, IEEE Proceedings, vol. 2, Catalog No. 95CH35844, pp. 1051–1060, Nov. 1995.*

* cited by examiner

*Primary Examiner*—A. Dexter Tugbang
(74) *Attorney, Agent, or Firm*—Owen L. Lamb

(57) ABSTRACT

Transducer suspensions are attached to actuator arms by means of bonding a portion of a thermoplastic actuator arm to the magnetic recording head suspension assembly. The actuator arm has rail portions that provide a channel in which the load beam and base plate flange fit. The rail portions are ultrasonically welded using a clamping ultrasonic horn, which causes melted plastic to flow over the flange The clamping ultrasonic horn causes heat to be applied and focused at prongs to cause the rails to flow and expand onto the flange rigidly connecting the base plate and load beam to the actuator arm.

12 Claims, 2 Drawing Sheets

METHOD OF ATTACHING A MAGNETIC RECORDING HEAD SUSPENSION ASSEMBLY TO A THERMOPLASTIC ACTUATOR ARM

CROSS-REFERENCE TO RELATED APPLICATIONS

This application is a division of Schmidt, et al. U.S. application Ser. No. 09/030,597 entitled "Attachment Of Magnetic Recording Heads To Actuator Arms Using Thermoplastic Bonding Of A Thermoplastic Base Plate Or A Thermoplastic Actuator Arm" filed Feb. 25, 1998 now abandoned, which is incorporated herein by reference.

BACKGROUND OF THE INVENTION

1. Field of the Invention

This invention relates to disk head assemblies for supporting read/write heads adjacent rotating disks in disk drives and more particularly, to a method of attaching a head suspension assembly to a head actuator arm using thermoplastic bonding of a thermoplastic actuator arm.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate pre-load or "gram load". Air turbulence caused by the rotating disks lifts the heads slightly off of the disks so that the heads fly on an air bearing across the disk surfaces. The air bearing force is counteracted by the suspension gram load. A spring section of the load beam is formed to provide the load force that counteracts the aerodynamic lift force generated by the rotating disk during operation of the disk drive.

A head-carrying suspension is attached to an actuator arm using a base plate that forms a part of the head suspension. The base plate includes a flat flange portion and a cylindrical hub portion or boss. The base plate hub is passed through a load beam clearance hole and the flange is spot welded to the load beam. The combined base plate, load beam and a flexure make up a head suspension, and the suspension typically has the hub of the base plate extending through and beyond the load beam clearance hole or alternatively the hub and load beam clearance hole are aligned and the flange is welded on the opposite side.

The hubs of the suspensions are inserted into an actuator arm, boss hole formed through an actuator arm extending from an actuator body, one hub entering an actuator arm boss hole from each end of the hole in a mid arm between the end-most arms. A swage ball is passed through the cylindrical hubs to force the peripheries of the hubs to expand (swage) into tight engagement with the inner peripheries of the actuator arm boss hole. Thus, an actuator arm may carry two suspensions on opposite sides thereof to support two transducer heads in opposing directions, one up and one down.

A typical base plate has two primary regions, a flange region and a hub region. The flange region is a flat portion to which the load beam is welded. This area preferably remains flat and free from distortion so that it serves as a stable mounting feature for the load beam and ideally remains so throughout the swaging operation.

The hub region is an extended boss whose upper end is contiguous with the flange portion and whose lower end passes through boss clearance holes in both the load beam and the actuator arm. The hub region supplies the retention torque between the base plate, which is welded to the load beam, and the actuator arm by plastically expanding and cold working during the swaging operation, creating a press fit with the actuator arm. A problem with this process is that the base plate flange becomes warped by stress from the hub during the swaging operation. Consequently, the load beam, which is welded to the base plate flange, is deformed by the warping of the base plate flange, adversely affecting the gram load on the transducer head. After assembly, the gram load is tested and if not correct the spring section of the load beam is bent appropriately to adjust the gram load to a predetermined standard. This operation may further distort the load beam and adversely affect the dynamic performance thereof Since the two transducer suspensions are joined to an actuator arm by passing a ball through two hubs in the same hole in the actuator arm, an asymmetry exists in the forces that are exerted on the hubs to make the joints. The transducers face in opposite directions and the hubs on their respective load beams also extend in opposite directions with respect to the direction of passage of the ball through the inner diameters of the hubs. For one transducer suspension, the ball is passed in a direction that tends to place the hub in compressive stress. For the other transducer suspension, the direction of passage of the ball is so as to tend to place the hub in tensile stress. This difference in stresses causes a variance in gram load change and joint integrity between the two swage directions.

It is therefore an object of this invention is to provide a method and means of attaching magnetic recording heads to actuator arms that reduces the large differing stresses and deformations associated with swaging that result in gram load change, joint integrity and gram load change differences between tension and compression swage directions.

SUMMARY OF THE INVENTION

A method of bonding a base plate of a head suspension to an actuator arm in which the actuator arm is fabricated of thermoplastic. The suspension and actuator arm are clamped together to form a head stack assembly and the thermoplastic is heated, with a heating tool that causes the thermoplastic to deform and bond together the base plate and the actuator arm.

The method of the invention involves the heating and folding over a portion of a thermoplastic actuator arm onto the suspension assembly to constrain and bond the suspension to the actuator arm, using an ultrasonic horn with tapered prongs.

The invention has the advantage that it reduces the large stresses and deformations associated with swaging that result in gram load change, joint integrity and gram load differences between up and down facing head.

The invention has the advantage that thermoplastic actuator arms greatly reduce disk damage in the drive that results from contact between the actuator arm and disk during a shock event incurred by the drive.

BRIEF DESCRIPTION OF THE DRAWINGS

The invention will be described in greater detail with reference to the drawings in which:

FIG. 1b is a side elevation view of the thermoplastic arm of FIG. 1a;

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1A:
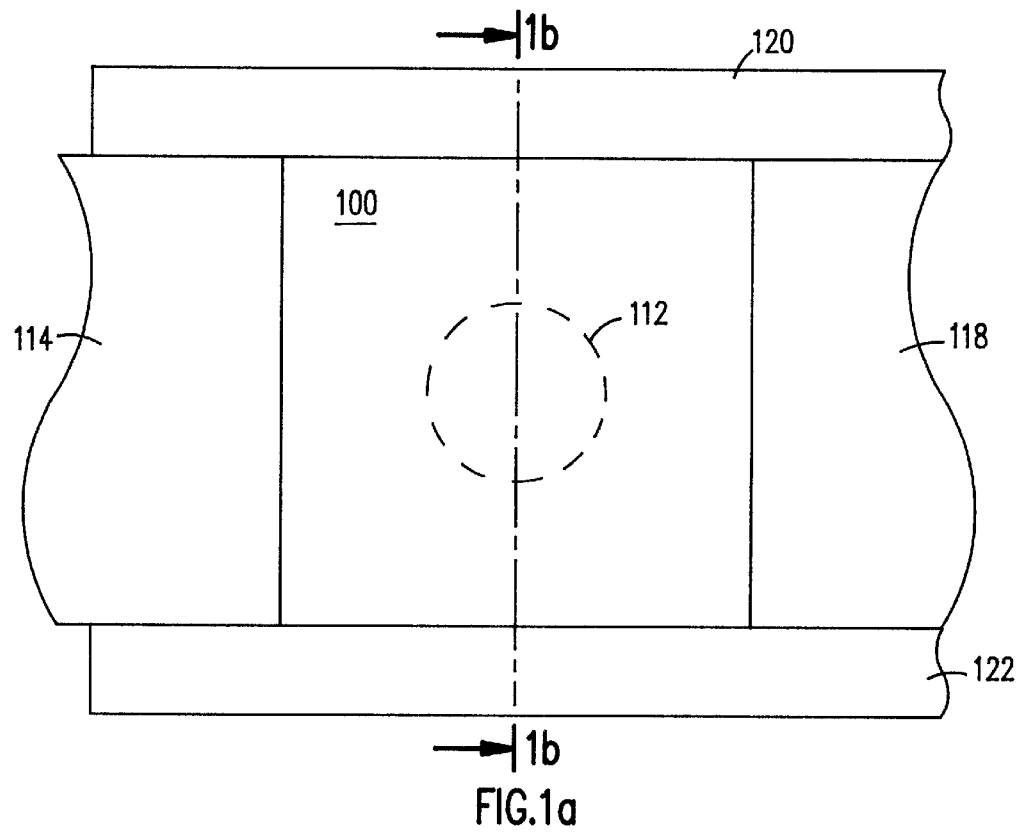
FIG. 1a is a top view, which illustrates a thermoplastic arm of an embodiment of the invention.
Figure 1B:
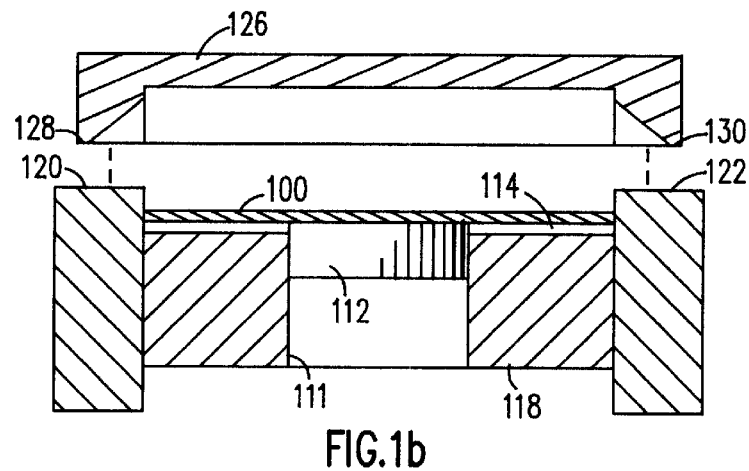

Refer to FIG. 1a and FIG. 1b, which illustrate an embodiment of the invention. An actuator arm 118 and load beam 114, which are elements of an head stack assembly (HSA), are connected end-to-end by a base plate. The base plate includes a flat flange portion 100 and a cylindrical locator hub 112 used for locating the suspension in hole 111 in arm 118. In assembling the HSA arm, the locator hub 112 is inserted into an arm boss hole in the arm 118. The actuator arm 118 has rail portions 120, 122 that provide a channel in which the load beam 114 and base plate flange 100 fit. The rail portions 120, 122 are ultrasonically welded using a clamping ultrasonic horn 126 which causes melted plastic to flow over flange 100. The clamping ultrasonic horn 126 causes heat to be applied and focused at prongs 128, 130, to cause the rails 128, 130, to flow and expand onto the flange 100, rigidly connecting the base plate 100 and load beam 114 to the actuator arm.

Figure 1C:
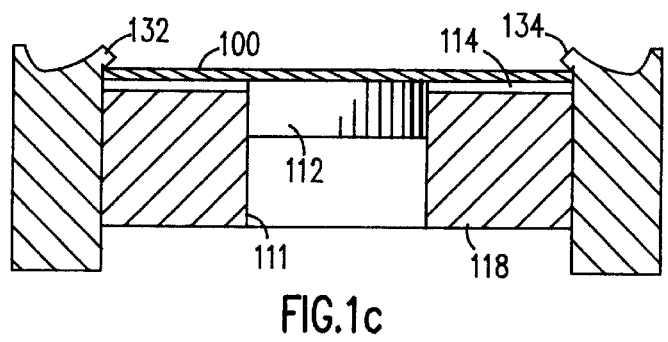
FIG. 1c is a side elevation view of the thermoplastic arm of FIG. 1a after heating by an ultrasonic horn.

FIG. 1c shows the assembly after ultrasonic bonding. Extruded plastic 132, 134, extends onto the flange 100, as a result of the prongs 128, 130 of the ultrasonic horn 126. The prongs preferably extend the length of the flange 100.

Figure 2:
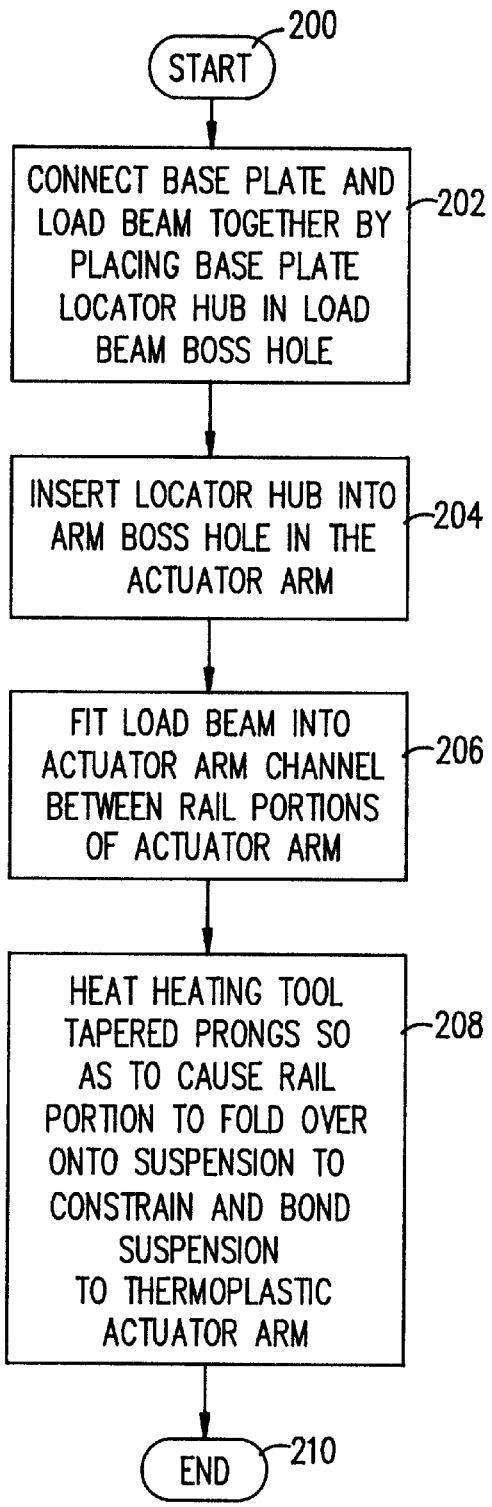
FIG. 2 is a flow chart of a first method of attaching a head suspension assembly to a head actuator arm using thermoplastic bonding with a thermoplastic actuator arm; and, FIG. 3 is a flow chart of a second method of attaching a head suspension assembly to a head actuator arm using thermoplastic bonding with a thermoplastic actuator arm.

Refer to FIG. 2, which is a flow chart of a first embodiment of the invention. The flow starts 200 and at step 202 an actuator arm and load beam are connected end-to-end by a base plate by placing the base plate locator hub into the load beam boss hole. At 204 the locator hub is used for locating the suspension in hole in arm by the locator hub being inserted into an arm boss hole in the actuator arm. At 206 the load beam and base plate flange are fit into the actuator arm rail portions that provide a channel. At 208 the rail portions are ultrasonically welded using a clamping ultrasonic horn which causes melted plastic to flow over the base plate flange. The clamping ultrasonic horn causes heat to be applied and focused at prongs to cause the rails to flow and expand onto the flange, rigidly connecting the base plate and load beam to the actuator arm.

Alternatively, the locator hub 112 may be replaced with a clearance hole for alignment with the holes in both load beam 114 and arm 118. In assembling the actuator arm, a locator tool is inserted through the load beam boss hole in load beam 114 and the arm boss hole in the arm 118. The clamping ultrasonic horn 126 causes heat to be applied as described above. The advantage of a clearance hole over a locator hub is reduced stack height of the finished head stack assembly.

Figure 3:
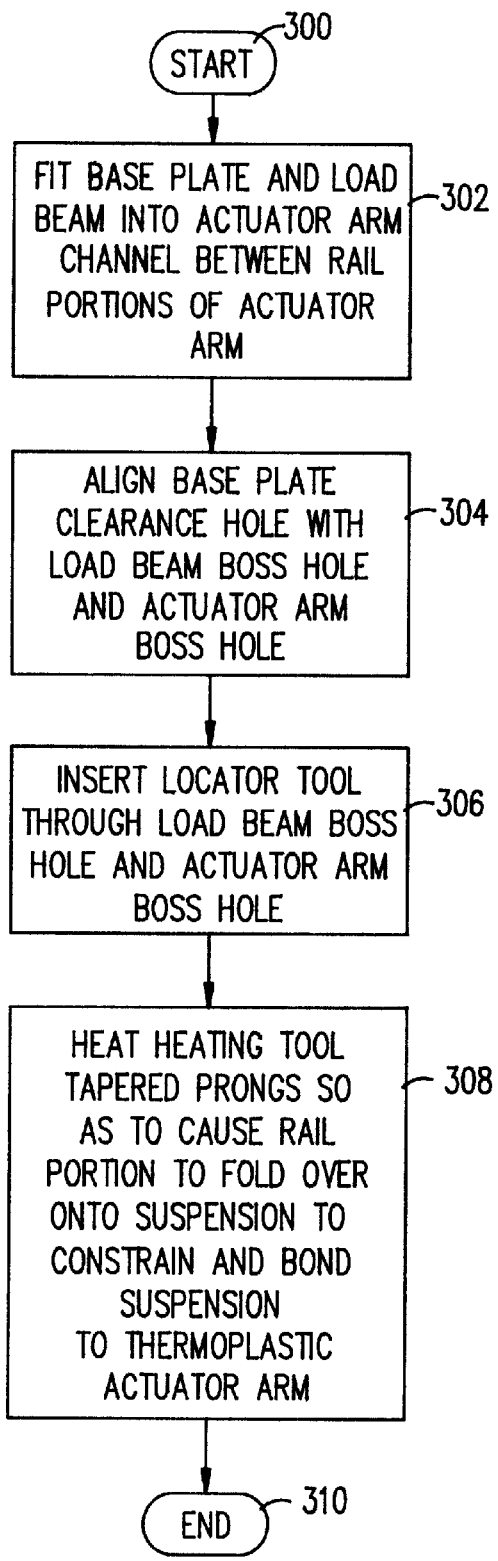

Refer to FIG. 3, which is a flow chart of a second embodiment of the invention. The flow starts 300 and at 302 the base plate and load beam are fit into the actuator arm channel between the rail portions of the actuator arm. At 304 the base plate clearance hole is aligned with the holes in both load beam and the actuator arm. At 306 a locator tool is inserted through the load beam boss hole in the load beam and the arm boss hole in the actuator arm. At 308 the rail portions are ultrasonically welded using a clamping ultrasonic horn which causes melted plastic to flow over the base plate flange. The clamping ultrasonic horn causes heat to be applied and focused at prongs to cause the rails, to flow and expand onto the flange, rigidly connecting the base plate and load beam to the actuator arm.

While the invention has been particularly shown and described with reference to preferred embodiments thereof, it will be understood by those skilled in the art that the foregoing and other changes in form and detail may be made therein without departing from the scope of the invention.

What is claimed is:

1. A method of attaching a head suspension to an actuator arm having a surface delineated by at least one outer side edge, the method comprising steps of:

A. Fabricating said actuator arm of thermoplastic;

B. Clamping said suspension and actuator arm together to form a head stack assembly; and, C. Heating said thermoplastic actuator arm with a heating tool that causes said thermoplastic actuator arm to deform so as to engage at least one outer side edge of said head suspension and said actuator arm.

2. The method of claim 1 wherein said actuator arm has a rail portion, and said heating tool has a number of tapered prongs, Said method step A comprising a further step of:
Aligning said rail portion with said suspension; and Said method step C comprising a further step of:
Driving said heating tool tapered prongs onto said rail portion of said actuator arm to cause said rail portion to fold over onto said at least one outer edge of said suspension.

3. The method of claim 2 wherein said heating tool is an ultrasonic horn.

4. The method of claim 1 wherein said heating tool is an ultrasonic horn.

5. The method of claim 1 wherein said actuator arm has an actuator arm boss hole, said suspension includes a load beam having a load beam boss hole and said step B includes inserting a base plate locator hub through said load beam boss hole and said actuator arm boss hole prior to clamping said suspension and actuator arm together.

6. The method of claim 1 wherein said actuator arm has an actuator arm boss hole, said suspension includes a load beam having a load beam boss hole and said step B includes inserting a locator tool through said load beam boss hole and said actuator arm boss hole prior to clamping said suspension and actuator arm together.

7. The method of claim 1 wherein said actuator arm has an actuator arm boss hole, said suspension includes a load beam having a load beam boss hole, said head suspension includes a base plate having a locator hub and said step B includes inserting said base plate locator hub through said load beam boss hole and said actuator arm boss hole prior to clamping said suspension and actuator arm together.

8. The method of claim 1 wherein said actuator arm has an actuator arm boss hole, said suspension includes a load beam having a load beam boss hole, said head suspension includes a base plate having a clearance hole and said step B includes inserting a locator tool through said clearance hole, said load beam boss hole and said actuator arm boss hole prior to clamping said suspension and actuator arm together.

9. A method of attaching a head suspension to a thermoplastic actuator arm having a surface delineated by at least one outer side edge, the method comprising steps of:

A. Heating a heating tool having a number of tapered prongs; and,

B. Driving said heating tool tapered prongs onto a rail portion located along at least one outer side edge of said thermoplastic actuator arm so as to cause said rail portion to fold over onto said suspension to constrain said suspension to said thermoplastic actuator arm.

10. The method of claim 9 wherein said heating tool is an ultrasonic horn.

11. The method of claim 7, wherein said thermoplastic actuator arm has two rail portions located along opposite outer side edges, further comprising the step of aligning said suspension between said two rail portions prior to step B.

12. The method of claim 11, wherein said two rail portions define a channel and the step of aligning said suspension comprises fitting said suspension into said channel.

* * * * *